United States Patent
Nallapareddy et al.

(10) Patent No.: US 10,931,572 B2
(45) Date of Patent: Feb. 23, 2021

(54) DECENTRALIZED CONTROL PLANE

(71) Applicant: VMware, Inc., Palo Alto, CA (US)

(72) Inventors: Maheedhar Nallapareddy, Palo Alto, CA (US); Akshay Katrekar, Mountain View, CA (US); Aarti Lolage, Palo Alto, CA (US); Nikhil Rajguru, Palo Alto, CA (US); Shyam Ramachandran, Palo Alto, CA (US); Tanmay Kumar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/253,935

(22) Filed: Jan. 22, 2019

(65) Prior Publication Data
US 2020/0236039 A1    Jul. 23, 2020

(51) Int. Cl.
*H04L 12/721*    (2013.01)
*H04L 12/931*    (2013.01)

(52) U.S. Cl.
CPC .............. *H04L 45/44* (2013.01); *H04L 49/70* (2013.01)

(58) Field of Classification Search
CPC ......... H04L 45/44; H04L 49/40; H04L 12/54; H04L 12/931; H04L 12/937; H04L 12/717; H04L 12/24
See application file for complete search history.

(56) References Cited

U.S. PATENT DOCUMENTS

| | | | |
|---|---|---|---|
| 2003/0108199 A1* | 6/2003 | Pinder | H04N 21/23895 380/200 |
| 2008/0198859 A1* | 8/2008 | Elias | H04L 45/26 370/392 |
| 2008/0313708 A1* | 12/2008 | Khan | H04L 63/1408 726/3 |
| 2013/0329584 A1* | 12/2013 | Ghose | H04L 45/586 370/252 |
| 2018/0013674 A1* | 1/2018 | Nainar | H04L 61/103 |
| 2018/0091361 A1* | 3/2018 | Smith | H04L 63/08 |

* cited by examiner

*Primary Examiner* — Anez C Ebrahim
(74) *Attorney, Agent, or Firm* — Patterson & Sheridan, LLP

(57) ABSTRACT

The disclosure provides an approach for decentralizing control plane operations in a network environment that includes transport nodes configured to implement a logical overlay network. A method includes transmitting a global list of transport nodes to each of the plurality of transport nodes from a management plane, the global list including an ordered list of the plurality of transport nodes. The method also includes transmitting a neighbor index value to each of the plurality of transport nodes, where the transport nodes each compute a corresponding list of neighbor transport nodes based on the neighbor index value and the global list of transport nodes. The method also includes, based on determining an update to a state of the logical overlay network has occurred by a first transport node, transmitting an update message from the first transport node to each transport node in the first transport node's list of neighbor transport nodes.

20 Claims, 6 Drawing Sheets

300

| Source TN_UUID | OPCODE | VTEP_IP | VNIC_IP | VNIC_MAC | VNIC_ID | SRC_TS | Digital Signature |
|---|---|---|---|---|---|---|---|
| | | | | | | | |

302 — Source TN_UUID
304 — OPCODE, VTEP_IP, VNIC_IP, VNIC_MAC, VNIC_ID, SRC_TS
306 — Digital Signature

| VNIC_ID | VNI | VTEP IPs | VNIC IP | VNIC MAC | TN_ID | DLR_ID | Create Timestamp | Received Timestamp |
|---|---|---|---|---|---|---|---|---|
| eth1UUID | 5000 | [10.10.1.100, ...] | 1.1.1.100 | A:B:C | TN1UUID | - | T1 | - |
| | | | | | | | | |

FIGURE 4

TZ1 Table on TN1

500

| VNIC_ID | VNI | VTEP IPs | VNIC IP | VNIC MAC | TN_ID | DLR_ID | Create Timestamp | Received Timestamp |
|---|---|---|---|---|---|---|---|---|
| eth1UUID | 5000 | [10.10.1.100, ...] | 1.1.1.100 | A:B:C | UUID-TN1 | DLRUUID1 | T1 | - |
| eth2UUID | 5000 | [10.10.2.100, ...] | 1.1.2.100 | X:Y:Z | UUID-TN2 | - | T2 | T3 |

550

TZ1 Table on TN2

| VNIC_ID | VNI | VTEP IPs | VNIC IP | VNIC MAC | TN_ID | DLR_ID | Create Timestamp | Received Timestamp |
|---|---|---|---|---|---|---|---|---|
| eth2UUID | 5000 | [10.10.2.100, ...] | 1.1.2.100 | X:Y:Z | UUID-TN2 | - | T2 | - |

FIGURE 5

TZ1 Table on TN1

600

| VNIC_ID | VNI | VTEP IPs | VNIC IP | VNIC MAC | TN_ID | DLR_ID | Create Timestamp | Received Timestamp |
|---|---|---|---|---|---|---|---|---|
| eth1UUID | 5000 | [10.10.1.100, ...] | 1.1.1.100 | A:B:C | UUID-TN1 | DLRUUID1 | T1 | - |
| eth2UUID | 5000 | [10.10.2.100, ...] | 1.1.2.100 | X:Y:Z | UUID-TN2 | DLRUUID1 | T2 | T3 |

TZ1 Table on TN2

650

| VNIC_ID | VNI | VTEP IPs | VNIC IP | VNIC MAC | TN_ID | DLR_ID | Create Timestamp | Received Timestamp |
|---|---|---|---|---|---|---|---|---|
| eth2UUID | 5000 | [10.10.2.100, ...] | 1.1.2.100 | X:Y:Z | UUID-TN2 | DLRUUID1 | T2 | - |

FIGURE 6

DECENTRALIZED CONTROL PLANE

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. SDN involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The control plane is served by an application that can run in a single computing device or on a cluster of devices that communicate with each other and maintain the same state. Typically the centralized control plane (CCP) runs as a cluster to allow for load balancing, fault tolerance, and high availably. The CCP may be considered a central entity, in that even though it may be implemented in a distributed manner, each instance of a control process operates independently to control a portion of the network, as opposed to working in conjunction with different control processes running on different computing devices.

Due to its centralized nature, a CCP comprises a single point of failure in a logical overlay network. If the CCP fails, limited control plane functionality may be available for the logical overlay network until the CCP is restored. Further, in large scale environments, changes can occur rapidly and frequently, and the size of the logical overlay network can make it difficult for the CCP to stay updated. Also, memory usage and computing complexity can be very high for a CCP in a large scale environment. Therefore what is needed is a new approach to the control plane in an SDN environment.

SUMMARY

Embodiments provide a method of decentralizing control plane operations in a network environment that includes transport nodes configured to implement a logical overlay network. The method includes transmitting a global list of transport nodes to each of the plurality of transport nodes from a management plane, the global list including an ordered list of the plurality of transport nodes. The method also includes transmitting a neighbor index value to each of the plurality of transport nodes, where the transport nodes each compute a corresponding list of neighbor transport nodes based on the neighbor index value and the global list of transport nodes. The method also includes, based on determining an update to a state of the logical overlay network has occurred by a first transport node, transmitting an update message from the first transport node to each transport node in the first transport node's list of neighbor transport nodes, the update message including information about the update.

Further embodiments include a non-transitory computer-readable storage medium storing instructions that, when executed by a computer system, cause the computer system to perform the method set forth above, and a system including a processor and a memory with a program executable in the processor to perform operations for carrying out the above method.

BRIEF DESCRIPTION OF THE DRAWINGS

FIG. 3 depicts a message format according to one embodiment.

FIG. 4 depicts an example entry in a transport node table, according to one embodiment.

FIG. 5 depicts two example transport node tables, according to one embodiment.

FIG. 6 depicts two example transport node tables, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach to decentralize the functionality of the control plane in a logical overlay network. Control plane functionality is distributed across the host machines (also referred to as transport nodes (TNs)) that implement the logical overlay network, which removes the single point of failure. The MP distributes information to each TN regarding the other TNs of the logical overlay network. In particular, hypervisors at each TN maintain the current state of the logical overlay network by communicating and distributing that state with other hypervisors at other TNs in the network. Each hypervisor of each TN builds its own network state with network state updates from hypervisors running on neighboring TNs and from changes happening on the hypervisor itself.

Figure 1:
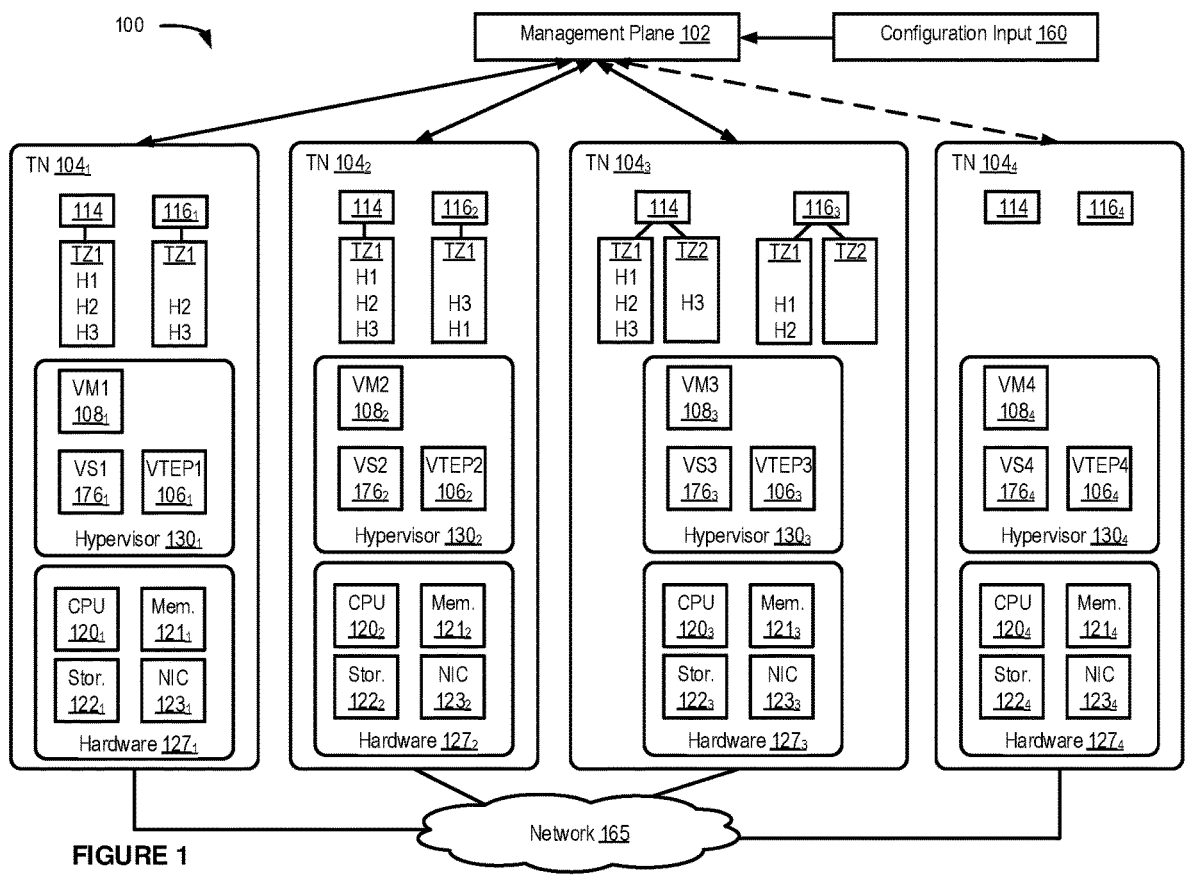
FIG. 1 is a block diagram of a network control system in which one or more embodiments of the present invention may be implemented.

FIG. 1 is a block diagram of a network control system 100 including a management plane (MP) 102 and TNs $104_1$-$104_4$ (collectively referred to as TNs 104 and individually referred to as TN 104), which are physical computing devices that support the execution of virtual machines (VMs) $108_1$-$108_4$ (collectively referred to as VMs 108 and individually referred to as VM 108). Although certain aspects herein are described with respect to VMs, it should be noted that the same techniques may be applied to other types of VCIs. The term "VCI" may refer to VMs, containers, Docker containers, data compute nodes, isolated user space instances, namespace containers, and the like.

Though management plane 102 is shown as a single entity, it may be implemented as a distributed or clustered system/application. For example, management plane 102 may include multiple computing devices that implement management plane functions. An example of a computing device may include a VM 108 executing on a TN 104, a TN 104 itself, etc.

TNs 104 typically include server grade hardware platforms ("hardware"), such as hardware $127_1$-$127_4$, respectively. An example of a server grade hardware platform is the x86 architecture platform. TNs 104 may be geographically co-located servers on the same rack or on different racks in any location within a data center. Each of TNs 104 is configured with a virtualization layer, referred to herein as a hypervisor (also referred to as HV). Each of hypervisors $130_1$-$130_4$ abstracts processor, memory, storage, and networking resources of a corresponding hardware platform $127_1$-$127_4$ into multiple virtual machines 108. VMs 108 on the same TN 104 may run any suitable guest operating system(s) and run concurrently with the other VMs 108.

Hypervisor 130 architecture may vary. In some aspects, hypervisor 130 is installed as system level software directly on the TN 104 (often referred to as a "bare metal" installation) and conceptually interposed between the physical hardware and the guest operating systems executing in VMs 108. Alternatively, hypervisor 130 may conceptually run "on top of" a conventional host operating system in the server. In some implementations, hypervisor 130 may comprise system level software as well as a privileged VM machine (not shown) that has access to the physical hardware resources of the TN 104. In such implementations, a virtual switch, virtual tunnel endpoint (VTEP), etc., along with hardware drivers, may reside in the privileged VM.

Hardware platform 127 of each TN 104 includes components of a computing device such as one or more processors (CPUs) 120, a system memory 121, a storage system 122, a network interface (referred to in FIG. 1 as "NIC") 123, and may further include a host bus adapter (HBA) (not shown), and other I/O devices such as, for example, a mouse and keyboard (not shown). Processor 120 is configured to execute instructions such as executable instructions that perform one or more operations described herein. The executable instructions may be stored in memory 121 and in storage system 122. Network interface 123 enables TN 104 to communicate with other devices via a communication medium, such as network 165. Network interface 123 may include one or more network adapters or ports, also referred to as Network Interface Cards (NICs), for connecting to one or more physical networks. Network 165 may be a local area network ("LAN"), a wide area network ("WAN"), or a network of networks, such as the Internet.

Memory 121 is hardware for allowing information, such as executable instructions, configurations, and other data, to be stored and retrieved. Memory 121 is where programs and data are kept when processor 120 is actively using them. Memory 121 may be volatile memory or non-volatile memory. The HBA of a TN 104 may couple the TN to one or more external storages (not shown), which may be a storage area network (SAN) or a distributed virtual SAN. Other external storages that may be used include a network-attached storage (NAS) and other network data storage systems, which may be accessible via network interface 123. Storage system 122 represents persistent storage device(s). Storage 122 may be one or more hard disks, flash memory modules, solid state disks, and/or optical disks. Although storage 122 is shown as being local to TN 104, storage 122 may be external to TN 104, such as by connection via the TN 104's HBA. In addition, storage systems $122_1$-$122_4$ may be used as part of a storage virtualization platform, such as virtual SAN (VSAN).

Hypervisors $130_1$-$130_4$ abstract processor, memory, storage, and/or networking resources of TNs $104_1$-$104_4$, respectively, into multiple VMs 108 that can run side-by-side on the same TNs $104_1$-$104_4$. That is, the virtualization software partitions physical TNs $104_1$-$104_4$ into multiple secure and portable VMs 108. Each VM 108 may represent a complete virtual system—with virtual processors, virtual memory, virtual networking interface, virtual disk storage, and its own BIOS. For example, each VM 108 comprises a software-based virtual network adaptor (not shown), also referred to as a virtual network interface card (VNIC) that is logically connected to hypervisor 130 running on TNs $104_1$-$104_4$ and provides network access for the VM 108. Each VM 108's VNIC is typically connected to a corresponding hypervisor 130 through a virtual switch.

Each hypervisor 130 includes an associated virtual tunnel endpoint (VTEP) 106. In the embodiment shown, VTEP 106 runs in the hypervisor 130. VTEP 106 may provide layer 2 tunneling services for encapsulating egress packets from VMs and decapsulating ingress packets to implement a logical overlay network to interconnect VMs running on different TNs as part of the same layer 2 overlay network, meaning as part of the same logical layer-2 network/broadcast domain in the logical overlay network. Such VMs that are interconnected as part of a same layer 2 network may be considered connected to the same logical switch. Each different logical layer-2 network/broadcast domain may be identified by and isolated using a different network identifier (e.g., VXLAN network identifier (VNI)).

The logical switch may be implemented by VTEPs and virtual switches running on the TNs as further discussed. Further, one method for hypervisors 130 to communicate with one another is through the respective VTEPs 106 associated with the hypervisors 130. Each VTEP 106 may be assigned a network address (e.g., MAC address and IP address) on a physical network (e.g., data network 165) to which TNs 104 are connected and address packets between each other using their network addresses. For example, VTEPs 106 may encapsulate packets using a tunneling protocol and exchange the encapsulated packets. VTEPs 106 may be implemented using tunneling protocols such as virtual extensible local area network (VXLAN), Stateless Transport Tunneling (STT), Generic Network Virtualization Encapsulation (GENEVE), or Generic Routing Encapsulation (GRE).

It should be noted that the term VTEP originally referred to a "VXLAN tunneling endpoint." However, while originally the term "VTEP" referred to "VXLAN" tunneling protocol, it is now often used regardless of the tunneling protocol, and therefore referred to herein as a "virtual" tunneling endpoint. This "backronym" can be misleading as the tunnel is not itself virtual, but does carry logical overlay networking traffic, which is sometimes referred to as virtual network traffic.

A hypervisor 130 may also include a virtual switch 176, which serves as an interface between the hosted virtual machines 108 running on TN 104, NIC 123, as well as other physical resources available on TN 104. VTEP 106 may be implemented in software by virtual switch 176, or outside of virtual switch 176 (e.g., as coupled to a virtual port of virtual switch 176) and functionally coupled to virtual switch 176 using forwarding tables.

Each of the virtual machines 108 may include a virtual network interface card (VNIC) (not shown), which is responsible for exchanging packets between the virtual machine 108 and hypervisor 130. VNICs may be, in some cases, a software abstraction of a physical network interface card. Each virtual machine 108 is connected to a virtual port (vport) provided by virtual switch 176, and virtual switch 176 is connected to NIC 123 to allow network traffic to be exchanged between virtual machines 108 executing on TN 104 and other network destinations such as virtual machines hosted by other TNs 104 on network 165.

In certain aspects, management plane 102 is responsible for receiving network configuration input 160 through an interface (e.g., an application programming interface or user interface). For example, users (e.g., network administrators) may input network configuration data through a user interface such as a command-line interface or graphical user interface. Network configuration input may, for example, comprise configuration data indicative of how multiple endpoints, such as VM 108, running on different TNs 104 may be connected through a logical Layer-2 or overlay network. More specifically, in certain aspects, each logical network configuration for each logical network includes data defining one or more endpoints and the connections between the endpoints. For example, network configuration input 160 may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc. Based on network configuration input 160, management plane 102 generates desired state data that specifies how the logical network should be implemented in the physical infrastructure.

The control plane functionality in network control system 100 is implemented by the hypervisors 130 of the TNs 104, thereby implementing the control plane functionality as a decentralized control plane (DCP), as further discussed herein. For example, the DCP updates/implements the logical network on TNs 104 based on the desired state information. For example, the DCP is responsible for managing and maintaining information about virtual entities including virtual machines, virtual switches, virtual routers, etc. implemented on TNs 104. When users provide configuration changes (e.g., creating or deleting logical entities, modifying properties of logical entities, changing relationships between logical entities, etc.), the changes to the desired state are distributed as state information updates to the DCP. The DCP is responsible for translating data received into configuration data formatted for virtual switches 176, VTEPs 106, VMs 108, and other virtual networking components not shown which may be implemented by transport nodes 104, such as access control list (ACL) filters, distributed firewalls, distributed load balancers, virtual middlebox services (also referred to as virtual network functions or service VMs), etc.

In embodiments herein that utilize a DCP, MP 102 distributes certain global information to each TN 104 regarding other TNs 104 in the network. The global information can include a global ordered list (GOL). In particular, MP 102 tracks all the TNs 104 participating in the logical overlay network, the public key of each TN, and the IP (Internet Protocol) address of each TN 104 in the GOL 114. GOL 114 is sent by MP 102 to each TN 104 and stored thereon. Therefore, every TN 104, such as the hypervisor 130 running on TN 140, knows the identity of the trusted participants, i.e., the other TNs 104, in the network.

Hypervisors 130 on the TNs 104 maintain the current state of the network by communicating and distributing state information amongst the other hypervisors 130 on other TNs 104 in the network. Every hypervisor 130 of a TN 104 maintains and updates its information on the current state of the network based on state information updates received from neighbor hypervisors 130 of its neighboring TNs 104 and from changes happening on the hypervisor itself, such as due to updates received directly from MP 102. The hypervisors 130 of the TNs 104 are configured to distribute the state information amongst each other based on the GOL 114 and other information as further discussed herein.

The functionality of the control plane is therefore distributed amongst all the TNs 104 of the logical overlay network via the hypervisors 130. It should be noted that DCP functions described as being performed by a TN 104 may specifically be performed by the hypervisor 130 running on the TN 104, or another appropriate software entity.

MP 102 updates the GOL 114 as needed. MP 102 also tracks global parameters such as neighbor index (NI), which is the number of neighbor TNs 104 that each TN 104 sends state information updates to, and MP 102 distributes the global parameters to the TNs 104 such as along with the GOL 114. The TNs 104 can be synced with a common Network Time Protocol (NTP) server (not pictured).

For each TN 104, the GOL 114 contains a TN UUID (universally unique identifier), a TN IP address, and the TN's public key. The global parameters can include an NI, a TTL (time to live) for forwarding tables, a TTL for information that is communicated, and other parameters. GOL 114 is sent to all TNs 104 along with the global parameters.

Upon receiving GOL 114 and the global parameters, each TN 104 computes a neighbor list (N-list) 116 based on NI in the global parameters. For a given TN 104, the N-list 116 contains the next NI TNs 104 in the GOL 114. For example, TNs 104 may be listed in order in the GOL 114, and the next NI TNs 104 for a given TN 104 refer to the following NI number of TNs 104 in the GOL 114. If the end of the GOL 114 is reached, the list starts over from the beginning (as with a circular list). For example, if the NI were 2 in a network with four TNs, ordered TN1-TN4 in GOL 114, TN1 would include TN2 and TN3 in its N-list 116. TN2 would include to TN3 and TN4 in its N-list 116. TN3 would include to TN4 and TN1 in its N-list 116. TN4 would include to TN1 and TN2 in its N-list 116.

Each TN 104 is configured to send state information updates to only the TNs 104 on its N-list 116. In this way, the TNs update one another in a decentralized manner, instead of using a CCP. Sending updates in this manner also prevents a broadcast storm of messages compared to each TN sending updates to every other TN.

In certain aspects, public keys or public certificates in GOL 114 are used by TNs 104 to establish the authenticity of messages including state information received from other TNs 104 to prevent unauthorized state changes. Well-known encryption algorithms can be used, such as SHA256 for generating message hashes and RSA for signing the message. Any messages found not to be authentic may be dropped.

In one example, a user may add a new TN $104_4$ to the logical overlay network using the MP 102. MP 102 updates GOL 114 with the IP address, public key, etc., of new TN $104_4$. MP 102 pushes the updated GOL 114 and global parameters to all the TNs 104 that are part of the logical overlay network, including new TN 104₄.

When new TN 104₄ is added, new TN 104₄ does not have all the state information about the logical overlay network. New TN 104₄ added by MP 102 therefore requests one of its neighbor TNs 104 from the GOL 114 to send state information so new TN 104₄ can configure its virtual entities, forwarding tables, etc. The neighbor TN 104 that receives the request may validate new TN 104₄'s public key before sending the state information to the TN 104 as discussed to prevent a rogue entity from receiving the state information.

When a new TN 104 joins the logical overlay network or leaves the network or is offline and not reachable, MP 102 updates GOL 114 and pushes the update to all participating TNs 104. Each TN 104 then recalculates its N-list 116. When a TN 104 is rebooted, the TN 104 requests one of its neighbors to send messages including state information updates.

In another example, when a VM 108 of a TN 104 joins a logical overlay network, such as due to MP 102 updating the configuration of a TN 104, the TN 104 transmits a state information update to all neighbor TNs 104 in its N-list 116. Those neighbors in turn send the information to their neighbors, etc. In certain embodiments, each TN 104 keeps a cache of messages it receives. If a new message is detected as a duplicate of a message received earlier, the duplicate message is dropped and not propagated to the neighbors, thereby preventing an endless propagation of messages including the same state information update.

Each TN 104 may further maintain transport zone (TZ) information. A TZ defines the reach of TNs 104 meaning that TNs 104 within a TZ can communicate with one another.

As shown, in certain aspects, each TN 104 maintains separate TZ information in GOL 114 and N-list 116. In particular, TZ1 includes TNs 104₁-104₃, indicating they each can communicate with one another. Since GOL 114 in each of TNs 104₁-104₃ includes information of each of TNs 104₁-104₃, it includes a TZ1 indicator for each of TNs 104₁-104₃. However, the N-list 116 of each of TNs 104₁-104₃ includes only its neighboring TNs 104 and therefore only includes a TZ1 indicator for its neighboring TNs 104 that are part of TZ1.

In addition, TZ2 includes TNs 104₃-104₄ indicating they each can communicate with one another. However, in this example, TN 104₄ has just been added to TZ2, and information indicating that TN 104₄ is part of TZ2 has not yet been propagated to TN 104₃ or TN 104₄. Accordingly, GOL 114 in TN 104₃ only indicates TN 104₃ is part of TZ2.

Figure 2:
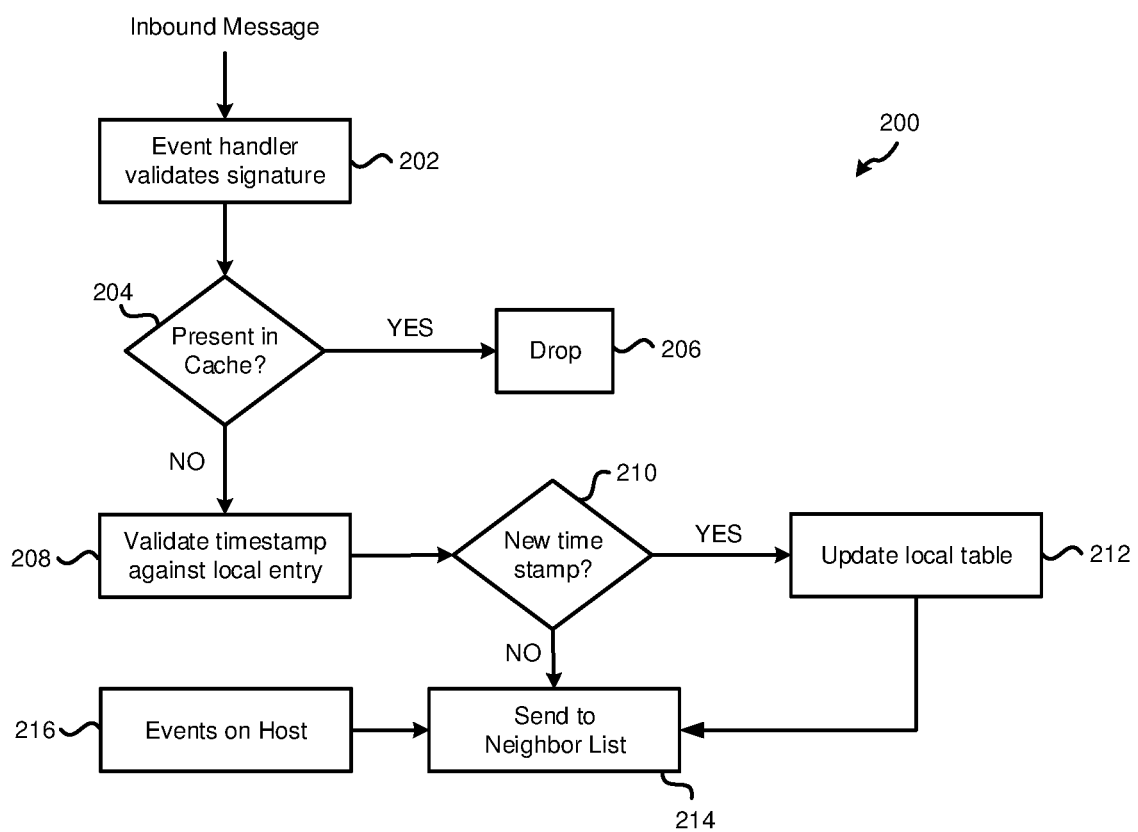
FIG. 2 depicts an example sequence of steps for handling an inbound message at a transport node.

FIG. 2 illustrates an example sequence of steps 200 for handling an inbound message including state update information at a TN 104 which acts as part of a DCP. The steps may be performed in any suitable order. The method begins at step 202, where an inbound message is received from another TN 104 and a signature of the inbound message is validated. For example, in certain embodiments, the message includes an identifier of the TN 104 that sent the message, the state update information, a hash of the state update information, a digital signature of the hash, and a timestamp of when the message was generated. The digital signature is created by the TN 104 that sends the message by generating the hash (e.g., a SHA256 hash) and signing the hash using the private key of the TN 104 that sent the message. The receiving TN 104 verifies the signature using a public key of the TN 104 that sent the message. In particular, based on the identifier of the sending TN 104 in the message, the receiving TN 104 retrieves the sending TN 104's public key from GOL 114. If verification fails, the message is discarded. If the signature is verified, the method proceeds to step 204.

At step 204, the receiving TN 104 generates a hash of the state update information of the inbound message to determine if the same state update information is already stored in the receiving TN 104's cache. A cache of recently processed messages (e.g., the messages themselves or some of the information from the messages including one or more of state update information, hashes, timestamps, etc.) is stored at each TN 104. The generated hash is compared to the hashes stored in the cache. If the generated hash matches one stored in the cache, that indicates the same state update information has already been received at TN 104, and the method proceeds to step 206 where the message is dropped. If the generated hash does not match one stored in the cache, then the same state update information has not been received at TN 104 previously, and the method proceeds to step 208.

At step 208, a timestamp of the inbound message is validated and compared to the timestamps stored in the TN 104's cache by directly indexing on the VNIC_ID in L2 table 400 (shown in FIG. 4). This step determines if the message is old or new as compared to previously received messages. At step 210, if the timestamp indicates a new message, the method proceeds to step 212. If the timestamp indicates an older message, the method proceeds to step 214.

At step 212, TN 104 updates its state information with the new state information from the inbound message. The method proceeds to step 214, where TN 104 sends a copy of the message to the neighbors in TN 104's N-list 116. The copy of the message may be modified from the originally received message. For example, state information regarding state updates that occur on TN 104 in step 216 may also be included in the message so that the neighbors can be updated on the status of TN 104. In other examples, the additional state information may be sent in one or more separate messages. Further, the copy of the message may be modified to replace the identifier of the TN 104 sending the message and the digital signature to correspond to those of the new sending TN 104. Accordingly, the TN 104 may need to generate a new digital signature using the hash. Further, an entry for the message is added to the cache.

Messages exchanged between TNs 104 have the format 300 illustrated in FIG. 3 in one example embodiment. The following format allows a TN 104 to ensure the authenticity of the sender by utilizing a signature. In addition, integrity can be achieved by transferring messages over a secure and reliable channel, such as by using TLS (transport layer security).

The message format 300 includes three parts: a universally unique identifier (UUID) 302 for the source TN, the state information 304, and a digital signature 306. The state information 304 includes: an OPCODE (such as join or leave if a TN is joining or leaving the network); a VTEP IP address; a VNIC IP address; a VNIC MAC address; a VNIC ID; and a timestamp. The digital signature 306 in this example is created by generating a hash of state information 304 and signing the hash using the TN 104's private key.

As one example, if a message is received at a TN 104 with an OPCODE of JOIN, a VM is joining a particular logical layer-2 network associated with a logical switch. If the VNI in the message matches the VNI associated with a logical switch implemented as a virtual switch on the TN, the state information at TN 104 is updated with the entry for the new VM (e.g., a VNIC ID for a VNIC of the new VM is updated in the state information). If a message is received with an OPCODE of LEAVE, the entry for the VM that is leaving is removed from the state information (e.g., a VNIC ID for a VNIC of the VM is removed from the state information). In certain embodiments, the state information is maintained as a table at TN 104.

A number of scenarios for network events are described below. The steps below illustrate example embodiments of how these tasks can be performed with a decentralized control plane.

A first scenario occurs when a VM is connected to a logical switch. A user can use MP 102 to configure a VM to connect to a logical switch. The hypervisor 130 of the TN 104 gets the VM information regarding the configuration. The hypervisor 130 uses the VM information and the information from MP 102 to create an entry in the TN 104's table corresponding to the updated state information, as illustrated in FIG. 4. Table 400 includes a VNIC_ID of eth1UUID for the VM. The VNI (in this case, of the logical switch) is included in the table, along with VTEP IP address of the VTEP on TN 104, the VNIC IP address of the VNIC associated with the VM, and the VNIC MAC address. The TN ID of TN1UUID is in table 400 as an identifier of the TN 104. DLR_ID is an ID for a distributed logical router (DLR) which is blank as the update is not associated with a distributed logical router. Further, the table 400 includes a create timestamp indicating the time the VM is created, and a received timestamp indicating the time that the information is received at this TN.

The entry in table 400 for the newly connected VM is propagated to the neighbors in the neighbor list 116 of this TN 104 with an update message as discussed. Then, each of the neighbors in the neighbor list 116 will forward the entry to the neighboring TNs 104 in their respective neighbor lists 116, and so on, until every TN 104 has received the update. Each TN 104 determines whether this entry should be added to its table based on the VMs connected to the VNIs.

A second scenario occurs when a first VM 108, VM1, residing on a first TN 104, TN1, attempts to communicate with a second VM 108, VM2, residing on a second TN 104, TN2, in the same TZ1 and connected to the same logical switch LS1.

FIG. 5 illustrates a table 500 that is the TZ1 table on TN1. Table 500 includes an example of the information stored on TN1 regarding TZ1. In another embodiment, TN1 may store another table for another transport zone TZ2. Using separate tables for each TZ can optimize lookups in the table. However, in other embodiments one table may be used at TN1 for all transport zones. FIG. 5 further illustrates a table 550 that is the TZ1 table on TN2.

When VM1 was initially connected to LS1 on TN1, TN1 would have propagated an entry corresponding to the connection of VM1 to LS1 to all TNs in TN1's neighbor list. Then, those TNs would forward the entry to the neighbors in their neighbor lists, and so on, until each TN has received the update. When TN2 received this update from TN1 (assuming TN2 is in TN1's neighbor list), TN2 processed the update with the steps described above. TN2 then forwarded the entry to the neighbors in TN2's neighbor list.

When VM2 connects to LS1 on TN2, TN2 adds the entry in its own table 550 for TZ1. TN2 also propagates that entry to its neighbors. TN1 processes the entry when it is received, either from TN2 or from a different neighbor, and adds it to table 500.

When VM1 wants to send traffic to VM2 on TN2, the hypervisor 130 on TN1 will look into TN1's TZ1 table for the destination VNIC IP address and VNI combination associated with VM2. TN1 will find the corresponding entry for eth2UUID. The hypervisor 130 on TN1 forwards the traffic to the destination VTEP IP address of TN2 from the entry in TN1's table. This is accomplished in some embodiments by translating the information from the tables to entries within the virtual switch and VTEP, which then carry out the forwarding and encapsulation steps. This translation could be performed when the VM is added to the overlay network or on receipt of the packet.

A third scenario occurs when VM1 and VM2 are coupled to different logical switches LS1 and LS2 in the same TZ. In this scenario, VM1 resides on TN1, connected to LS1 in TZ1. VM2 resides on TN2, connected to LS2 in TZ1. Both LS1 and LS2 are connected through DLR1.

FIG. 6 illustrates a table 600 that is the TZ1 table on TN1 for the third scenario. FIG. 6 further illustrates a table 650 that is the TZ1 table on TN2. When VM1 was initially connected to LS1 on TN1, TN1 would have propagated a corresponding entry to all the TNs in TN1's neighbor list. The neighbors in TN1's neighbor list forward the entry to the neighbors in their respective neighbor lists, and so on, until each TN in TZ1 has received the entry. When TN2 received this update from TN1, TN2 processed the update as described above. Since there are no VMs on TN2 at this time, TN2 does not add the entry to its table. TN2 then forwarded the entry to the neighbors in TN2's neighbor list.

When VM2 connects to LS2 on TN2, TN2 adds the entry in its own table for TZ1. TN2 also propagates this entry to its neighbors. TN1 processes the entry and adds an entry for VM2 in its table. TN1 then forwards this entry to its neighbors, and so on.

When VM1 attempts to send traffic to VM2 on TN2, hypervisor 130 on TN1 will look into the TZ1 table 600 for the destination VNIC IP address, VNI, and DLR combination. TN1 will find the corresponding entry for eth2UUID. The hypervisor 130 on TN1 will forward the traffic to the destination VTEP IP address of TN2 from the entry.

When VM2 attempts to send traffic to VM1 on TN1, hypervisor 130 on TN2 will look into the TZ1 table 650 for the destination VNIC IP address. The entry is not in table 650. TN2 sends an Address Resolution Protocol (ARP) request to find out TN1's destination VTEP IP address where the VM1 resides. Hypervisor 130 on TN1 responds to the ARP request because TN1 and TN2 are connected through the DLR. In some embodiments, information from the tables is translated to entries within the virtual switch and VTEP, which then carry out the forwarding and encapsulation steps to handle traffic forwarding. This translation could be performed when the VM is added to the overlay network or on receipt of the packet. For an example of a distributed logical router, see U.S. Pat. No. 9,785,455 entitled "Logical Router," which is incorporated herein by reference in its entirety.

If there is no ARP response, traffic is sent to the default gateway/uplink configured for the DLR that the LS is connected to. The DLR configuration includes the uplink information and is pushed by the management plane during the initial DLR configuration. The DLR uplink is connected to a logical endpoint that decides to either forward the traffic to the physical/logical network or drop the traffic.

A fourth scenario occurs when VM1 attempts to send data to VM2, where VM1 and VM2 are not connected to the same logical switch and are part of different TZs. In this scenario, traffic has to be forwarded from the source VM to the default gateway, which is connected to the overlay network and is configured to handle overlay network traffic. It is up to the default gateway to forward or drop the traffic. For an example gateway for a logical overlay network, see U.S. Patent Application Publication 2018/0152322 entitled "Method and System for Virtual and Physical Network Integration" incorporated herein by reference in its entirety.

Eviction policies can also be created and used in embodiments of the DCP described herein. The entries in the tables corresponding to state information stored at each TN 104 can be cleaned up by the hypervisor 103 on a frequent basis as described in the examples below.

First, if a VM at a TN 104 is disconnected from a LS, the VM's entry is removed from the TN 104's table. Also, the TN 104 will notify its neighbor about this update, and the update is propagated throughout the network using the neighbor lists.

Second, each entry has a timestamp associated with it. A TTL is set on a TN. When the TTL is expired, the entry is removed from the table by the hypervisor 103 on the TN. The mechanism of removal can be as simple as maintaining a TTL. The mechanism could also take a least recently used entry approach, where the table size is fixed at a constant and the least recently used entry is removed when the fixed size is reached. Any other suitable removal mechanism may be used in other embodiments.

Third, when a TN is removed from a TZ, the TN's public keys are directed to be removed from the TNs within that TZ. Such a measure allows TNs to drop messages sent by a removed TN and subsequently evict entries related to the entities under that TN.

At times, a TN may become disconnected from the rest of the network. This can happen due to a variety of reasons, including no network connectivity or server crashes. With a DCP, the remainder of the TNs keep operating and exchanging updates even in the face of TN failures. One example embodiment achieves this with a combination of heartbeat messages and caching of messages to and from disconnected TNs.

Heartbeat messages may be exchanged periodically between TNs at the neighbor list level to help with detecting unresponsive TNs. A heartbeat message may simply include an indicator of the TN sending the heartbeat message. A TN receiving the heartbeat message may track when a heartbeat message was last received from each neighboring TN. Each TN may determine if the time a last heartbeat message was received from a neighboring TN exceeds the current time by a threshold, and if so, determine that the neighboring TN is unresponsive. The threshold to tolerate missed heartbeat messages may depend on the service level times required and can be set at MP 102.

In addition, for each given neighbor TN, the sending TN of a message including a state information update as discussed maintains a cache of the messages (e.g., in a queue) sent to the neighbor TN. Once a heartbeat message is received from the neighbor TN, the sending TN removes the messages sent prior to the heartbeat message from the cache. In the case of an unresponsive neighbor TN, the heartbeat messages are not received by the sending TN and the size of the cache grows. When the unresponsive neighbor TN is back online or when the network connectivity has been restored, that neighbor TN resumes sending heartbeat messages. When the sending TN receives the heartbeat message, the sending TN refers to the corresponding cache and sends any outstanding messages to the neighbor TN.

Instead of being unresponsive, a TN may be unidentified. An unidentified TN is any TN that is not registered with MP 102 or any TN that is not part of a TZ, but still tries to send messages. Such messages are dropped by virtue of the unidentified TN's public key that is not present with the neighboring TNs. Thus, the neighboring TNs cannot decode the messages and the messages will be dropped.

A possible failure scenario in a decentralized control plane design is in the case of network partitioning. In this scenario, a group of TNs are disconnected from other TNs. This can happen when a core router that connects two subnets fails, or when a link to an upstream router (e.g., subnet router) fails. This scenario is different than an unresponsive TN case where an individual TN goes down independently.

Figure 7:
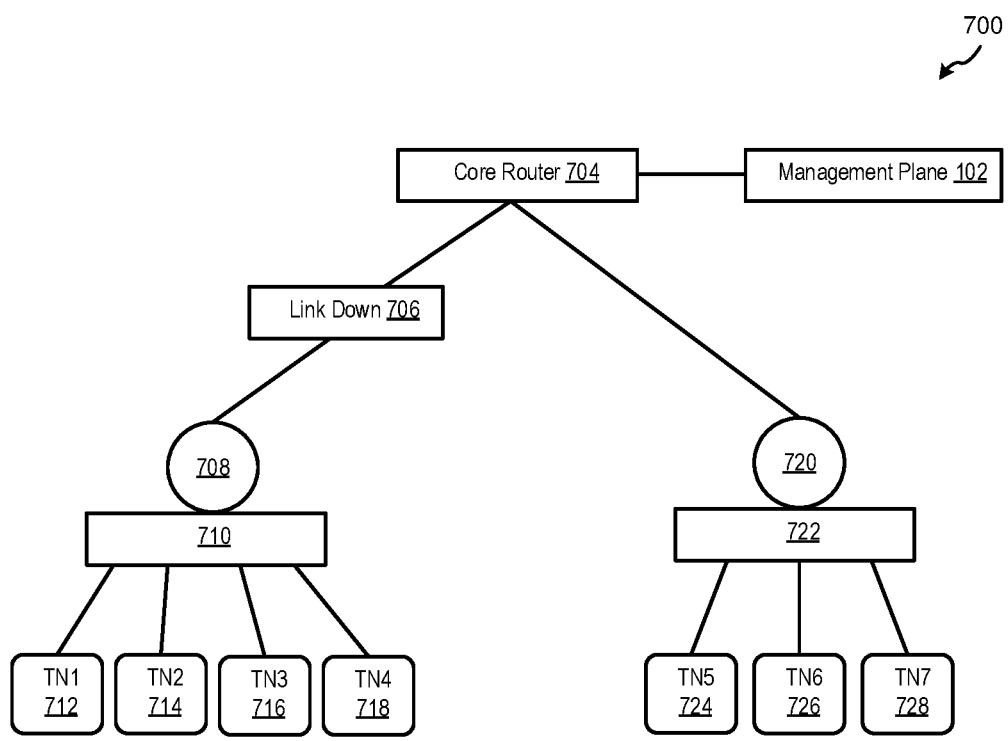
FIG. 7 depicts an example network with a failed link, according to one embodiment.

FIG. 7 illustrates an example network 700 where a link has gone down. A physical core router 704 is coupled to MP 102. Core router 704 is also connected to physical subnet router 708 and physical subnet router 720. Subnet router 708 interconnects TNs 712, 714, 716, and 718, which may be referred to as partition 710. Subnet router 720 interconnects TNs 724, 726, and 728, which may be referred to as partition 722. In embodiments of a DCP described herein, groups of TNs (e.g., partitions) keep operating to update state information even when disconnected from other partitions. The TNs in one partition keep exchanging updates with currently reachable TNs in that partition.

Three example types of failure scenarios may occur. First, a TN in a partition may only be able to reach a small number of its neighbors. Second, a TN in a partition may not be able to reach any of its neighbors. Third, a partition may be disconnected completely from MP 102. For example, in network 700, the link 706 between core router 704 and subnet router 708 is down. Partition 710 cannot communicate with partition 722 and vice versa. In addition, TNs 712, 714, 716, and 718 in partition 710 cannot reach MP 102.

In each of the above failure scenarios, DCP embodiments described herein ensure that TNs are able to carry out network control operations by coordinating with TNs that are reachable. In the first failure scenario, where a TN in a partition may only be able to reach a few of its neighbors, the TN will lookup active TNs from the global list 114 and recreate its neighbor list 116. After that, the TN will send updates to its neighbor TNs.

In the second failure scenario, where a TN in a partition cannot reach any of its neighbors, the TN will create a new neighbor list 116 from the global list 114 currently stored on the TN. In the third failure scenario, where a partition is disconnected completely from MP 102, the TNs can perform some control operations like adding/updating/deleting a VM from an existing LS, but cannot participate in other operations like creating a new LS.

The DCP design allows two network partitions to have a different logical state. Once the network partitions connect back together, the TNs attempt to synchronize their logical state. Queued messages are re-sent, while TTL fields associated with each entry are read. Once the entries expire, newer updates will take their place. The two recently merged partitions will therefore reconstruct their state.

At times, ARP resolution is performed by the hypervisor 130 to determine physical addresses of other entities in the network. As discussed, every table entry for state information stored at a TN 104 is associated with a timestamp and TTL fields. A table entry is treated similarly to a cache entry as discussed and is valid if the timestamp+TTL is greater than the current time. With a CCP, a process is responsible for flushing out stale entries in a TN and requesting the CCP for updates. In the DCP, at the end of a TTL for a table entry, the TN makes an ARP request on the global list to determine if any table entries are stale. If no response is received for a table entry, that entry is stale. This approach makes a DCP system highly available and keeps it functioning even if there are catastrophic failures.

A CCP requires every TN to maintain an active TCP connection with every controller node of the CCP. If one of the connections is broken, the complete state is not received. A DCP does not have this requirement. The DCP does add some additional traffic among the TNs, but the additional load is minimal. In DCP, network states are generally updated more quickly than with a CCP. Another advantage of the DCP is that it eliminates the need for controller nodes that often require a large amount of resources in terms of compute, storage, and network. Additional advantages of the DCP include no single point of failure, greater resilience, lower latency, easy scaling, and performance improvements as a result of parallelizing the processing.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for decentralizing control plane operations in a network environment comprising a plurality of transport nodes configured to implement a logical overlay network, comprising:
   transmitting a global list of transport nodes to each of the plurality of transport nodes from a management plane, the global list including an ordered list of the plurality of transport nodes;
   transmitting a neighbor index value to each of the plurality of transport nodes, wherein the transport nodes each compute a corresponding list of neighbor transport nodes based on the neighbor index value and the global list of transport nodes; and
   based on determining an update to a state of the logical overlay network has occurred by a first transport node, transmitting an update message from the first transport node to each transport node in the first transport node's list of neighbor transport nodes, the update message including information about the update.

2. The method of claim 1, wherein determining the update comprises one of:
   receiving information about the update from the management plane at the first transport node; or
   receiving a message from a second transport node including the information about the update.

3. The method of claim 1, wherein the update message further includes one or more of a timestamp, a hash of the information about the update, and a signature associated with the first transport node.

4. The method of claim 3, further comprising:
   receiving the update message at a second transport node;
   determining by the second transport node that the signature is associated with the first transport node based on a public key associated with the first transport node; and
   further processing the update message by the second transport node based on the determining.

5. The method of claim 3, further comprising:
   receiving the update message at a second transport node;
   comparing, by the second transport node, the hash with a plurality of hashes corresponding to previously received messages stored at the second transport node;
   discarding, by the second transport node, the update message when the hash matches one of the plurality of hashes; and
   forwarding, by the second transport node to a third transport node, the update message when the hash does not match one of the plurality of hashes.

6. The method of claim 5, further comprising
   comparing by the second transport node the timestamp with a plurality of timestamps corresponding to the previously received messages stored at the second transport node; and
   updating state information stored at the second transport node based on the update message when the timestamp is later than the plurality of timestamps.

7. The method of claim 1, further comprising:
   updating the global list of transport nodes when a transport node joins or leaves the logical overlay network; and
   updating the list of neighbor transport nodes on each transport node when the transport node joins or leaves the logical overlay network.

8. A non-transitory computer-readable storage medium containing a program which, when executed by one or more processors, performs operations for decentralizing control plane operations in a network environment comprising a plurality of transport nodes configured to implement a logical overlay network, the operations comprising:
   transmitting a global list of transport nodes to each of the plurality of transport nodes from a management plane, the global list including an ordered list of the plurality of transport nodes;
   transmitting a neighbor index value to each of the plurality of transport nodes, wherein the transport nodes each compute a corresponding list of neighbor transport nodes based on the neighbor index value and the global list of transport nodes; and
   based on determining an update to a state of the logical overlay network has occurred by a first transport node, transmitting an update message from the first transport node to each transport node in the first transport node's list of neighbor transport nodes, the update message including information about the update.

9. The computer-readable medium of claim 8, wherein determining the update comprises one of:
   receiving information about the update from the management plane at the first transport node; or
   receiving a message from a second transport node including the information about the update.

10. The computer-readable medium of claim 8, wherein the update message further includes one or more of a timestamp, a hash of the information about the update, and a signature associated with the first transport node.

11. The computer-readable medium of claim 10, the operations further comprising:
    receiving the update message at a second transport node;
    determining by the second transport node that the signature is associated with the first transport node based on a public key associated with the first transport node; and
    further processing the update message by the second transport node based on the determining.

12. The computer-readable medium of claim 10, the operations further comprising:
    receiving the update message at a second transport node;
    comparing, by the second transport node, the hash with a plurality of hashes corresponding to previously received messages stored at the second transport node;
    discarding, by the second transport node, the update message when the hash matches one of the plurality of hashes; and
    forwarding, by the second transport node to a third transport node, the update message when the hash does not match one of the plurality of hashes.

13. The computer-readable medium of claim 12, the operations further comprising
    comparing by the second transport node the timestamp with a plurality of timestamps corresponding to the previously received messages stored at the second transport node; and
    updating state information stored at the second transport node based on the update message when the timestamp is later than the plurality of timestamps.

14. The computer-readable medium of claim 8, the operations further comprising:

updating the global list of transport nodes when a transport node joins or leaves the logical overlay network; and updating the list of neighbor transport nodes on each transport node when the transport node joins or leaves the logical overlay network.

15. A system, comprising:

a processor; and a memory, wherein the memory includes a program executable in the processor to perform operations for decentralizing control plane operations in a network environment comprising a plurality of transport nodes configured to implement a logical overlay network, the operations comprising:

transmitting a global list of transport nodes to each of the plurality of transport nodes from a management plane, the global list including an ordered list of the plurality of transport nodes;

transmitting a neighbor index value to each of the plurality of transport nodes, wherein the transport nodes each compute a corresponding list of neighbor transport nodes based on the neighbor index value and the global list of transport nodes; and based on determining an update to a state of the logical overlay network has occurred by a first transport node, transmitting an update message from the first transport node to each transport node in the first transport node's list of neighbor transport nodes, the update message including information about the update.

16. The system of claim 15, wherein determining the update comprises one of:

receiving information about the update from the management plane at the first transport node; or receiving a message from a second transport node including the information about the update.

17. The system of claim 15, wherein the update message further includes one or more of a timestamp, a hash of the information about the update, and a signature associated with the first transport node.

18. The system of claim 17, the operations further comprising:

receiving the update message at a second transport node;

determining by the second transport node that the signature is associated with the first transport node based on a public key associated with the first transport node; and further processing the update message by the second transport node based on the determining.

19. The system of claim 17, the operations further comprising:

receiving the update message at a second transport node;

comparing, by the second transport node, the hash with a plurality of hashes corresponding to previously received messages stored at the second transport node;

discarding, by the second transport node, the update message when the hash matches one of the plurality of hashes; and forwarding, by the second transport node to a third transport node, the update message when the hash does not match one of the plurality of hashes.

20. The system of claim 15, the operations further comprising:

updating the global list of transport nodes when a transport node joins or leaves the logical overlay network; and updating the list of neighbor transport nodes on each transport node when the transport node joins or leaves the logical overlay network.

* * * * *